US005769472A

United States Patent [19]

Small

[11] Patent Number: 5,769,472

[45] Date of Patent: Jun. 23, 1998

[54] DRIVE IN HOUSING HALVES FOR MOUNTING A LATCH ASSEMBLY IN A DOOR AND A METHOD OF INSTALLING SAME

[75] Inventor: Steven D. Small, San Francisco, Calif.

[73] Assignee: Schlage Lock Company, San Francisco, Calif.

[21] Appl. No.: 775,472

[22] Filed: Dec. 30, 1996

[51] Int. Cl.[6] .............................. E05B 9/00; F16B 21/18

[52] U.S. Cl. .................. 292/337; 292/1.5; 292/DIG. 53; 292/DIG. 64; 411/353; 411/999

[58] Field of Search .................................... 292/244, 337, 292/DIG. 53, DIG. 60, DIG. 64, 1.5; 411/352, 353, 999

[56] References Cited

U.S. PATENT DOCUMENTS

| | | | |
|---|---|---|---|
| 150,437 | 5/1874 | Schilling . | |
| 179,919 | 7/1876 | Hendricks et al. . | |
| 357,084 | 2/1887 | Hollenbeck . | |
| 929,638 | 7/1909 | Voight . | |
| 2,961,264 | 11/1960 | Hillgren | 292/164 |
| 3,055,691 | 9/1962 | Kessel | 292/337 |
| 5,039,146 | 8/1991 | Lin | 292/337 |
| 5,094,488 | 3/1992 | Boadwine et al. | 292/337 |
| 5,308,131 | 5/1994 | Galindo et al. | 292/337 |
| 5,364,138 | 11/1994 | Dietrich et al. | 292/1.5 |
| 5,474,346 | 12/1995 | Fann et al. | 292/337 |

*Primary Examiner*—Neill R. Wilson

*Attorney, Agent, or Firm*—Robert F. Palermo; Michael H. Minns

[57] ABSTRACT

A drive-in housing for mounting a latch assembly in a bore formed in a door comprises two identical housing parts each having a slot therein. When the housing parts are brought together they form an opening for receiving a bolt casing of the latch assembly. Tabs on the casing are captured in the slots as the housing parts are moved normal to the axis of the casing. Movement of the casing relative to the housing parts is then limited by direct engagement of the housing parts with the tabs. The housing parts each have two abutment surfaces facing in a circumferential direction, the abutment surfaces of one housing part having a projection and a recess, respectively, for mating with a corresponding recess and projection on the abutment surfaces of the other housing part. The housing parts, when brought together, form a faceplate having an opening therein for accommodating a bolt.

10 Claims, 4 Drawing Sheets

DRIVE IN HOUSING HALVES FOR MOUNTING A LATCH ASSEMBLY IN A DOOR AND A METHOD OF INSTALLING SAME

FIELD OF THE INVENTION

This invention relates to latch assemblies, and more particularly to a drive-in housing for mounting a latch assembly in a bore formed in the free edge of a door.

BACKGROUND OF THE INVENTION

Conventionally, a latch assembly for a wooden door comprises an operating mechanism for sliding a bolt (latchbolt or deadbolt) back and forth within a cylindrical latch casing. The latch assembly is mounted in a first bore extending into the door from its free or unhinged edge. A second bore extends through the door and intersects the first bore. A shaft extends through the second bore and the operating mechanism, the shaft being rotatable by an actuator such as a handle or lock plug to selective extend the bolt beyond the edge of the door or retract the bolt into the door. Typically, the latch assembly is positioned and secured within the first bore by a rectangular faceplate which engages two radially extending tabs provided on one end of the latch casing. The free edge of the door is mortised so that the faceplate lies flush with the edge surface, and the faceplate is fixed to the door by screws. A latch assembly of this type is shown, for example, in U.S. Pat. No. 5,308,131. The faceplate is relatively expensive and the time required to mortise the door so that the faceplate lies flush with the edge surface is a substantial portion of the total time required to install the latch assembly.

To reduce the installation time, circular drive-in housings of different types have been proposed. U.S. Pat. No. 3,055,691 discloses a circular one-piece drive-in housing which serves as a faceplate. The housing has an axially extending opening for receiving a cylindrical casing, and detents or projections which engage openings in the latch casing to fix the position of the casing relative to the housing. The housing has a knurled area on its outer surface for engaging the wood material of the door to thereby prevent inhibit movement of the housing relative to the door after the housing has been driven into position flush with the edge of the door.

Typically, one-piece drive-in housings can not be used with latch casings having tabs for engaging a faceplate. If the dimension of the casing, measured between the tips of the tabs is great enough to engage the faceplate, the tabs will not pass through the opening in the drive-in housing. On the other hand, if the tip-to-tip distance is made small enough to permit passage of the tabs into the opening in the housing the tabs are unable to engage the housing at a point on the periphery of the opening. One known exception is disclosed in U.S. Pat. No. 5,094,488 wherein a drive-in housing is provided with two axially extending slots through which the tabs on the end of a cylindrical casing pass as the casing is inserted into an axially extending opening in the housing. After the casing is positioned within the housing, a C-shaped retainer spring is mounted in a peripheral slot on the housing. The spring serves to engage the tabs and inhibit movement of the casing relative to the housing in one axial direction. A certain degree of manual dexterity is required to spread the C-shaped spring and position it in the peripheral slot while at the same time holding the latch assembly and housing together with the casing pressed fully into the housing. Also, the axially extending slots for accommodating the tabs structurally weaken the housing thus making it more susceptible to deformation as it is driven into a bore in a door.

SUMMARY OF THE INVENTION

An object of the present invention is to provide a circular drive-in housing comprising two parts or housing halves which are easily assembled to each other and to a latch assembly via tabs extending radially outwardly from a cylindrical bolt casing of the latch assembly.

Another object of the invention is to provide a drive-in housing for securing in a bore of a door a latch assembly of the type including a cylindrical casing having an axis and tabs rigidly fixed to the casing and extending radially outwardly therefrom, the drive-in housing comprising first and second separable housing parts which, when brought together, form a housing having an opening for receiving a casing, each housing part having a slot therein for receiving and capturing a respective tab on a casing received in the opening to thereby limit all axial or rotational movement of a received casing relative to the housing parts by direct engagement of the housing parts with respective tabs. The first and second housing parts are preferably identical and are arcuate in shape so that when they are brought together they form a generally cylindrical housing. First and second end surfaces of the first housing part are provided with a projection and a slot, respectively, which engage a slot and projection on the end surfaces of the second part to maintain the two parts in position relative to each other as the parts are driven into the bore in the door. Each housing part has a flange portion at one end for limiting movement of the part into the bore and the flange portions together form a faceplate with an opening therein through which a bolt may extend. Each housing part is provided with one or more ridges or ribs which extend in the axial direction when the housing parts are brought together. The ridges prevent rotation of the housing parts after the housing is driven into a bore. Preferably, the ridges are inclined to make it easier to drive the housing into a bore, or remove the housing from a bore.

A further object of the invention is to provide a drive-in housing as described above in combination with a latch assembly having a cylindrical casing with tabs rigidly fixed to and extending radially outwardly from one end of the casing.

Still another object of the invention is to provide a method of securing a latch assembly of the type including a cylindrical casing having an axis and tabs extending radially outwardly from the casing, the method comprising the steps of providing a housing comprising two separable housing parts which, when brought together, form an opening for receiving a casing, each housing part having a slot therein; moving the housing parts toward the casing in a direction normal to the axis of the casing with the slots aligned with the tabs so that the opening is formed with the casing in the opening and the tabs are captured in the slots; while the tabs are captured in the slots, inserting the latch assembly into the bore at least far enough to bring the housing parts into contact with the door; and applying a driving force to the housing parts to drive the housing parts into the bore.

Other objects and advantages of the invention and the manner of making and using it will become obvious from consideration of the following description and the accompanying drawings.

DETAILED DESCRIPTION OF THE INVENTION

Figure 1:
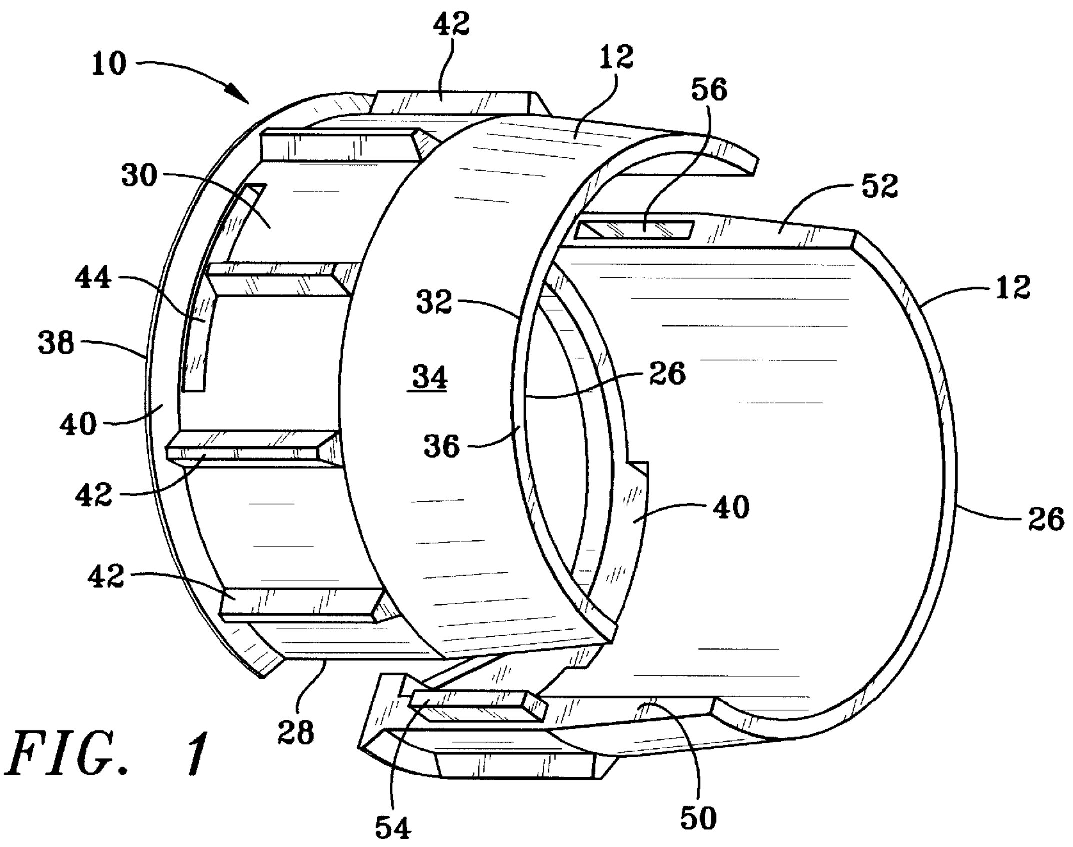
FIG. 1 is a perspective view of a drive-in housing comprising two separable drive-in housing parts.

Referring now to the drawings wherein like reference numerals indicate like elements in each of the figures, a drive-in housing 10 (FIG. 1) comprises first and second drive-in housing parts or halves 12 for mounting a so-called cylindrical latch assembly 14 (FIG. 3) in a door. The latch assembly 14 is conventional and comprises a cylindrical casing 18 having two parts 18*a*, 18*b* with two oppositely disposed and radially outwardly extending tabs 20 on the part 18*a*, and a bolt 22 slidable in the casing by a bolt operating mechanism 24.

The illustrated latch assembly is adjustable to provide adjustable back-set as is known in the art. To provide this adjustment, the casing part 18*a* is slidable within casing part 18*b* and a projection (not shown) is provided on part 18*b* for engaging a configured opening 19 (FIG. 4) at either one of two axial positions. As will be evident from the following description, the present invention is equally suitable for use with latch assemblies without the housing part 18*a* to provide adjustable back-set, the tabs 20 in this case being disposed on the casing part 18*b*. Tabs 20 and casing 18 (either part 18*a* or 18*b*) generally comprise a monolithic structure so that the tabs are rigidly fixed relative to the casing.

Figure 2:
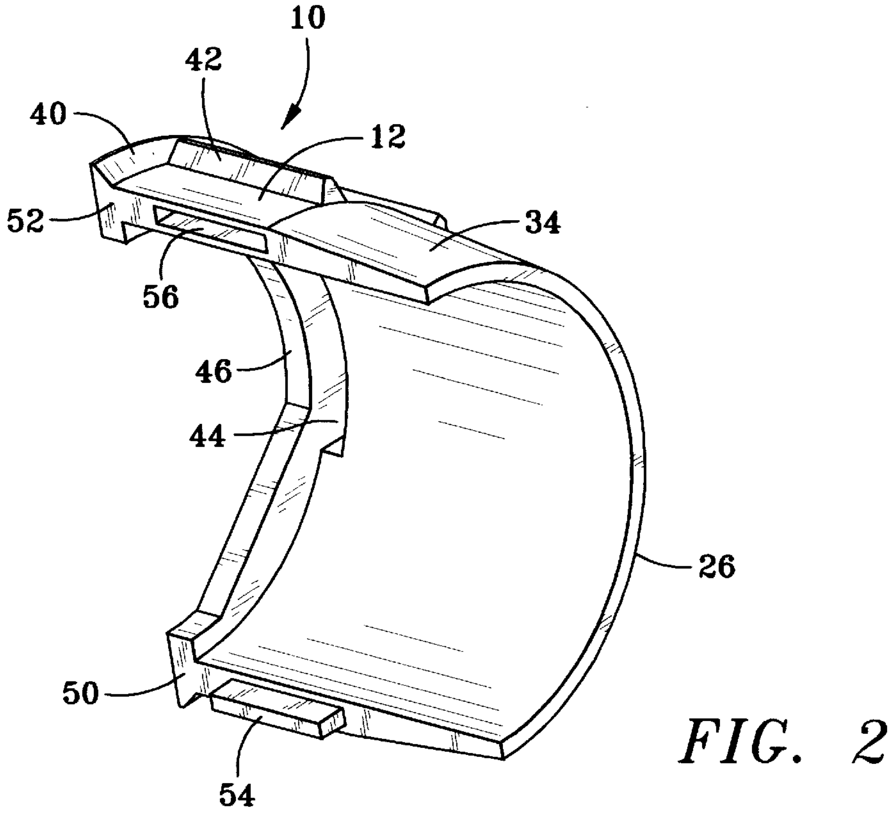
FIG. 2 is a perspective view of one housing part.

Each drive-in housing part 12 is identical to the other. As illustrated in FIGS. 1 and 2, each housing part 12 comprises a monolithic C-shaped or semi-cylindrical body 26 having an outer surface 30. The body 26 comprises a mid-section 28 located between an end section 32 and a flange section 38. The end section 32 has an outer surface 34 which slopes inwardly from the mid-section 28 to an end surface 36.

The mid-section 28 is provided with a plurality of spaced-apart ribs and outwardly projecting ribs 42 extending longitudinally on the surface 30. As will be evident from the description below, these ribs bite into wood around the periphery of a bore when the housing part 12 is driven into the bore, thus inhibiting rotation of the housing part relative to the door in which the bore is formed. Ribs 42 are preferably generally triangular in section to reduce the force required to drive the housing part 12 into the bore. Also, ribs 42 are slanted or sloped, the ends toward flange section 38 extending further above surface 30 than the ends near end section 32. This further reduces the force required to drive the housing part into the bore, or remove the housing part from the bore.

The mid-section 28 of each housing part 12 is provided with a slot 44 for receiving and capturing a respective tab 20 as the housing parts are brought together with the latch assembly casing 18 between them. Each slot 44 extends through mid-section 28 from exterior surface 30 to the interior surface in a region adjacent flange section 38. Mid-section 28 at least partially bounds slot 44 on all four sides so all rotational and axial movement of a latch casing is inhibited by engagement of a tab with the mid-section 28 of the housing part.

The flange section 38 has a radially extending lip 40 which extends outwardly by a distance slightly greater than the outermost extent of ribs 42. Lip 40 thus serves to cover the ends of the grooves formed in the door when the ridges 42 bite into the wood as the housing part is driven into the bore. The flange section 38 of each housing part 12 is contoured so that when the two housing parts are assembled together the flange sections together form a faceplate having an opening 46 therein which conforms substantially to the outer periphery 48 of bolt 22.

The first and second housing parts 12 each have first and second abutment surfaces 50,52 facing in a circumferential direction. Abutment surface 50 of each housing part has a projection 54 extending in the circumferential direction for engagement in a groove 56 in formed in the abutment surface 52 of the other housing part. Projections 54 and grooves 56 serve to inhibit movement of the first and second housing parts relative to each other as, and after, they are driven into a bore. Preferably, projections 54 fit into grooves 56 with a slight interference so that the housing parts tend to hold together once they are assembled.

Figure 3:
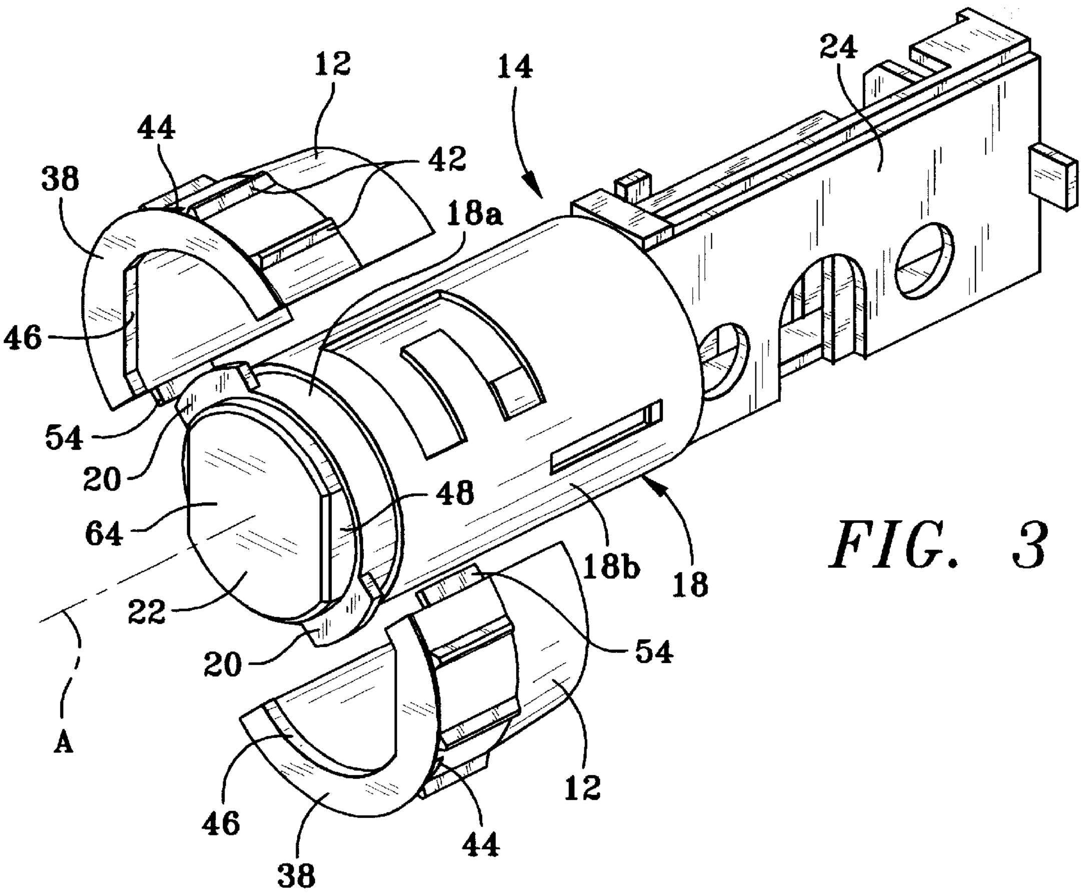
FIG. 3 is an exploded perspective view of the drive-in housing parts and a cylindrical latch assembly prior to bringing the housing parts together.
Figure 4:
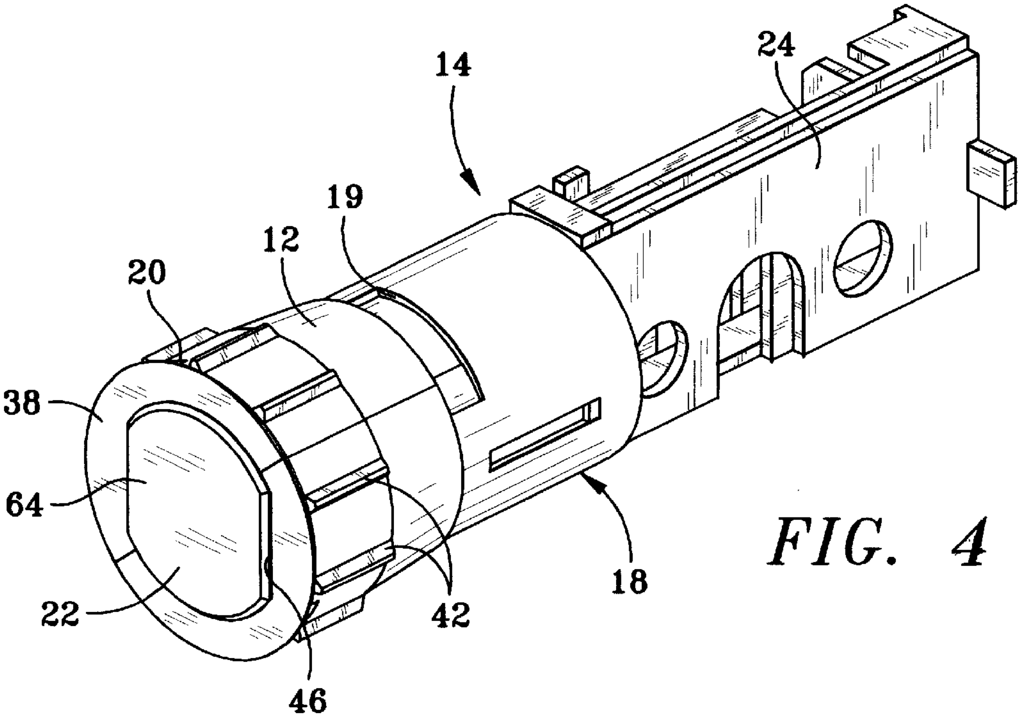
FIG. 4 is a perspective view of the two housing parts assembled on the latch assembly.

FIGS. 3–7 illustrate the steps of securing the latch assembly 14 in a door using the first and second housing parts 12. The door 16 (FIG. 7) is first prepared in a conventional manner by forming therein a first bore 58 and a second bore 62. Bore 58 extends into the door from the free or unhinged edge surface 60. Bore 62 extends through the door from one side of the door to the opposite side and intersects bore 58. After the door has been prepared, the first and second housing parts 12 are positioned relative to the latch assembly 14 as shown in FIG. 3. The first and second housing parts 12 are aligned with the axis A of the latch assembly 14 with the slots 44 in the housing parts aligned with respective ones of the tabs 20 on the casing 18, and the housing parts are moved toward the casing normal to its axis thus forming an opening which receives the casing as the tabs are captured in the slots. The housing parts do not have to move concurrently. That is, a first housing part 12 with its slot 44 may be aligned with the axis and one tab 20 of the casing and moved toward the casing until the tab is captured in the slot. An installer may then hold the assembled first housing part and latch assembly 14 in one hand as he aligns the second housing part and its slot with the casing and the other tab, and moves the second housing part toward the casing and the first housing part until the abutment surface 50 (FIG. 1) of one housing part abuts the abutment surface 52 of the other housing part and the projections 54 extend into the recesses 56. FIG. 4 shows the first and second housing parts as thus assembled on the latch assembly.

Figure 5:
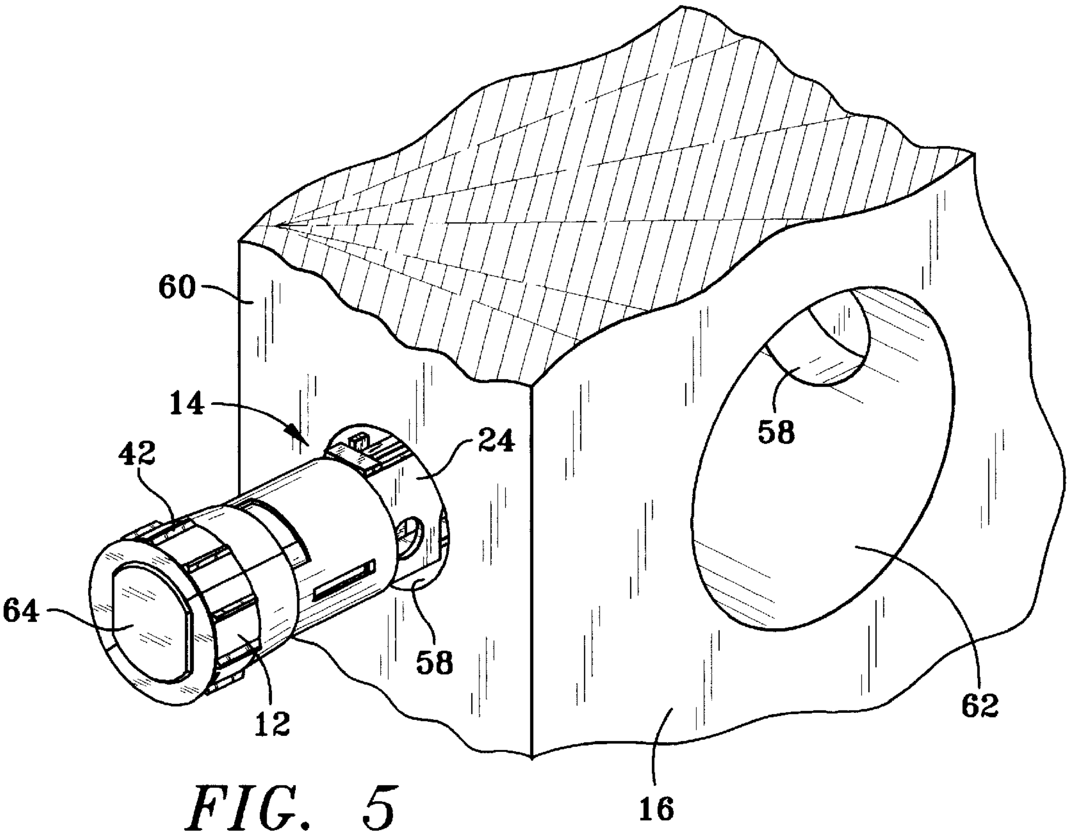
FIG. 5 is a perspective view of the housing parts and latch assembly positioned for insertion into a bore in an edge of a door.

After the housing parts are assembled on the latch assembly 14, the entire assembly is roughly aligned with bore 58 as shown in FIG. 5 and inserted into the bore, latch assembly first, until the ridges 42 come into contact with the wood bounding the periphery of the bore. Typically, the diameter of bore 58 is one inch, the outer diameter of the housing, measured at mid-section 28 is one inch, and the ridges 42 extend outwardly from the surface 30 of the mid-section to a maximum of about 1⁄16 inch. The sloping surface 34 (FIG. 2) centers the housing parts relative to the bore as the housing parts enter the bore.

Figure 7:
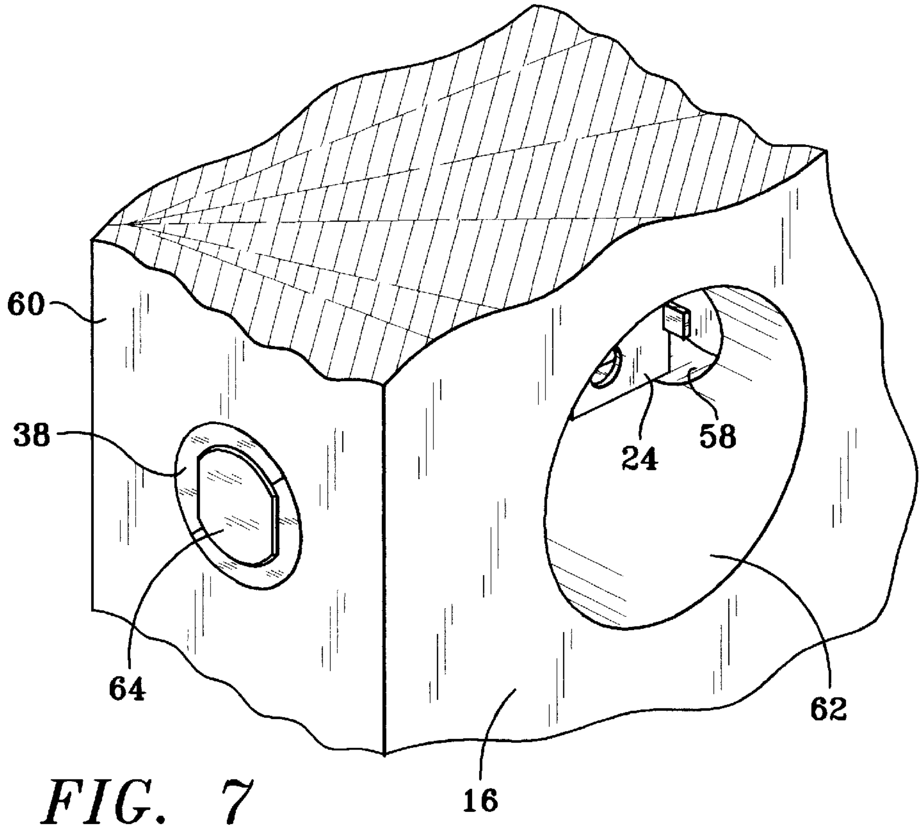
Figure 6:
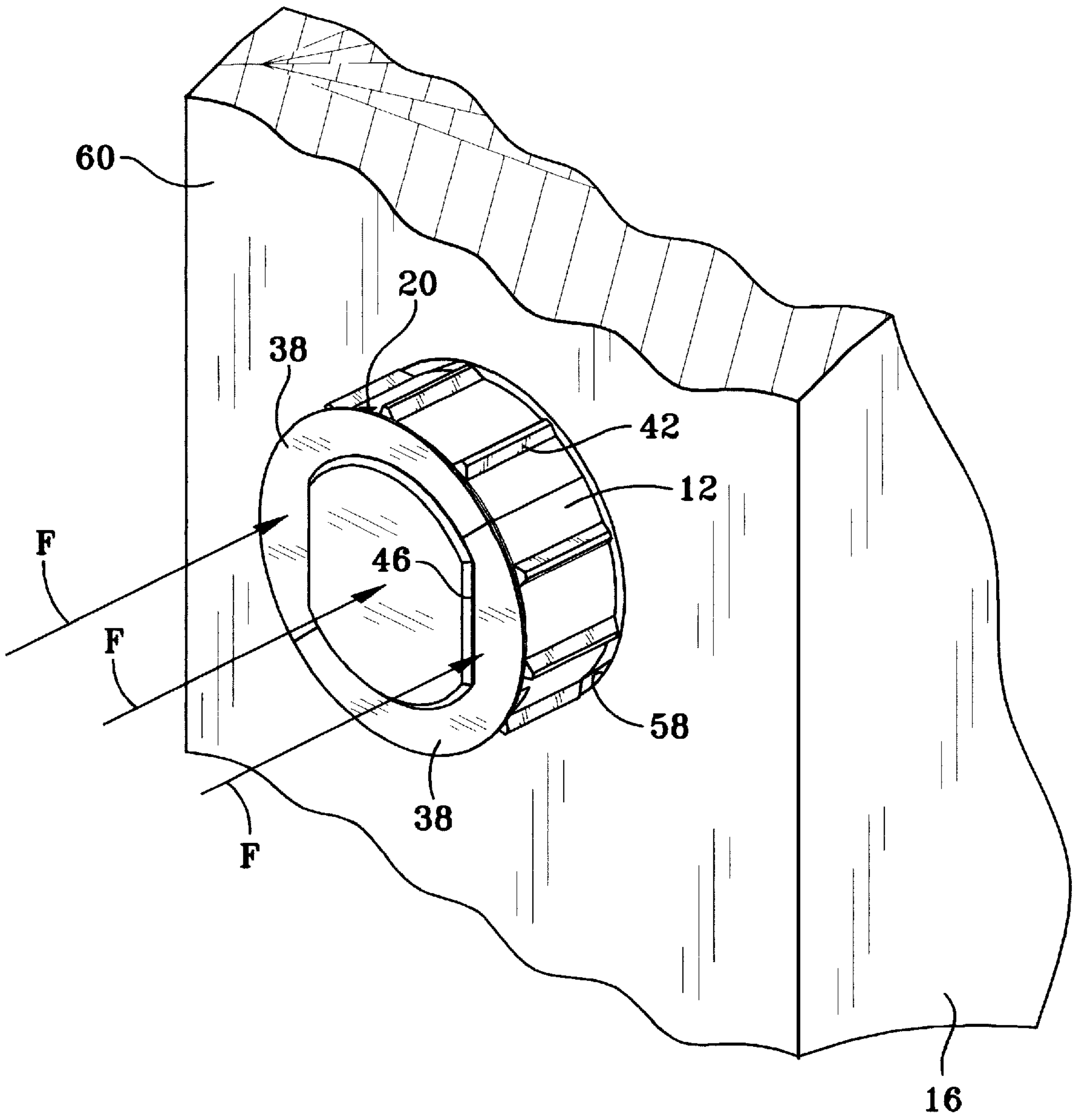
FIG. 6 is a perspective view illustrating the step of driving the drive-in housing into the bore; and, FIG. 7 is a perspective view showing the drive-in housing and latch assembly installed in a door.

Next, a driving force F is applied to the surfaces 38 of the housing parts in a direction parallel to the axis of the latch assembly as depicted in FIG. 6. As the housing parts are driven into the bore 58, the ridges 42 bite into the wood of the door bounding the bore to thus prevent rotation of the housing parts relative to the door. The driving force is applied until the surfaces 38 of the housing parts 12 are flush with the edge surface 60 of the door as shown in FIG. 7. An actuating shaft, lock cylinders and knobs or handles (not shown) may then be assembled on the door in bore 62 in a conventional manner.

From the foregoing description it is seen that the present invention provides a housing comprising two housing parts 12 which, when brought together, define an opening for receiving a latch assembly casing 18, each housing part having a slot 44 for receiving a respective one of two tabs rigidly fixed to the casing. Because the housing parts are separable, it is possible to mount the casing in the housing with the tabs in the slots even though the tabs are rigidly fixed to the casing and are radially separated by a distance greater than the diameter of the opening which receives the casing. When so mounted, the housing parts capture the tabs and inhibit rotational and axial movement of the housing parts relative to the casing by direct engagement of the housing parts with the tabs.

It will be apparent to those skilled in the art that the preferred embodiment of the invention described above may be modified in various ways without departing from the spirit and scope of the invention as defined by the appended claims.

What at is claimed is:

1. A drive-in housing for securing in a bore of a door a latch assembly of the type including a cylindrical casing having an axis and tabs rigidly fixed to the casing and extending radially outwardly therefrom, the drive-in housing comprising first and second separable housing parts which, when brought together, form a housing having an opening for receiving a casing, each housing part having a slot therein for receiving and capturing a respective tab on a casing received in the opening to thereby limit all axial or rotational movement of a received casing relative to the housing parts by direct engagement of the housing parts with respective tabs.

2. A drive-in housing as claimed in claim 1 wherein said housing parts are identical in shape.

3. A drive-in housing as claimed in claim 1 wherein the housing formed when the first and second housing parts are brought together has a cylindrical mid-section and a flange section, said flange section forming an opening for accommodating a bolt and having a radially outwardly extending rim portion.

4. A drive-in housing as claimed in claim 3 wherein said mid-section has a plurality of longitudinally extending ridges for biting into wood surrounding a bore.

5. A drive-in housing as claimed in claim 4 wherein said housing has an end section with a surface that slopes longitudinally and inwardly from said mid-section.

6. A drive-in housing as claimed in claim 4 wherein said ridges are slanted and project further outwardly from said mid-section near said flange section than they do near said end section.

7. A drive-in housing as claimed in claim 1 wherein said first housing part includes a projection and a recess on first and second surfaces, respectively, for engaging a recess and a projection provided on second and first surfaces, respectively, of said second housing part.

8. A drive-in housing as claimed in claim 7 wherein said first and second housing parts are semi-circular and the first and second surfaces of said first housing part abut said second and first surfaces, respectively, when the first and second housing parts are brought together.

9. The combination comprising a latch assembly and a drive-in housing for securing the latch assembly in a bore in a door, said latch assembly including a cylindrical casing having an axis and tabs rigidly fixed to the casing and extending radially outwardly therefrom, the drive-in housing comprising first and second separable housing parts which, when brought together, form a housing having an opening for receiving said casing, each housing part having a slot therein for receiving a respective tab on said casing as said casing is received in said opening, each of said housing parts capturing the tab received into the slot in the housing part to thereby limit all axial or rotational movement of a received casing relative to the housing parts by direct engagement of the housing parts with said respective tabs.

10. A drive-in housing for securing in a bore of a door a latch assembly of the type including a cylindrical casing having an axis and tabs rigidly outwardly therefrom, the drive-in housing comprising identical first and second separable housing parts which, when brought together, for a housing having an opening for receiving a casing, each housing having a means for limiting axial and rotational movement of the cylindrical casing relative to the housing, the means comprising a slot therein for receiving and capturing a respective tab on a casing received within the opening.

* * * * *